United States Patent
Gupta et al.

(10) Patent No.: US 11,418,646 B1
(45) Date of Patent: Aug. 16, 2022

(54) SYSTEMS AND METHODS TO TERMINATE AN ACTIVE COMMUNICATION

(71) Applicant: Avaya Management L.P., Durham, NC (US)

(72) Inventors: Vikram Gupta, Pune (IN); Prashant Jawale, Pune (IN); Omkar Mozar, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/157,531

(22) Filed: Jan. 25, 2021

(51) Int. Cl.
*H04M 3/436* (2006.01)
*H04M 3/51* (2006.01)
*H04M 3/523* (2006.01)
*G06N 3/08* (2006.01)

(52) U.S. Cl.
CPC .......... *H04M 3/4365* (2013.01); *G06N 3/084* (2013.01); *H04M 3/5235* (2013.01); *H04M 2203/2033* (2013.01)

(58) Field of Classification Search
CPC ...... G06N 3/084; H04M 3/4365; H04M 3/51; H04M 3/523; H04M 3/5235; H04M 2203/2033
USPC .................................................. 379/211.01
See application file for complete search history.

(56) References Cited

U.S. PATENT DOCUMENTS

| | | | |
|---|---|---|---|
| 8,634,543 B2 | 1/2014 | Flockhart et al. | |
| 2002/0067821 A1* | 6/2002 | Benson | H04M 3/51 379/265.02 |
| 2003/0078782 A1* | 4/2003 | Blair | H04M 3/51 704/270.1 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2012/0099714 A1* | 4/2012 | Hodge | H04M 3/2281 379/88.16 |
| 2012/0288082 A1* | 11/2012 | Segall | H04M 3/5158 379/266.07 |
| 2015/0043727 A1* | 2/2015 | Mistry | H04M 3/5175 379/266.07 |

\* cited by examiner

*Primary Examiner* — Harry S Hong
(74) *Attorney, Agent, or Firm* — Sheridan Ross P.C.

(57) ABSTRACT

Contact centers often provide a restricted amount of time for agents to perform post-call activities, including identifying and selecting a relevant completion code from a large set of codes. Providing automated systems and methods to identify the relevant code or codes can present a limited number of the codes (e.g., quick release codes) to the agent and/or automatically enter the completion code. When the quick release code is entered, the record of the call is then updated with the code and the communication is terminated as a single step.

20 Claims, 7 Drawing Sheets

SYSTEMS AND METHODS TO TERMINATE AN ACTIVE COMMUNICATION

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for communication management between networked nodes and particularly to termination of said communications.

BACKGROUND

In a contact center, agents conduct calls (e.g., voice, video, etc.) with customers. The calls commonly have a purpose, which may be referred to as a 'work item,' such as to obtain a service (e.g., book travel, schedule a meeting, activate a mobile phone, troubleshoot a problem, etc.), obtain information (e.g., determine a current account balance, availability inquiry, etc.), provide information (e.g., respond to a survey, provide information related to goods or services, etc.) or other purpose. When the communication ends, the agent provides a completion code. For example, a completion code may indicate that the call ended with customer booking travel, a technical problem was not resolved and a follow-up is required, the connection failed mid-call, the customer was happy, angry, required a supervisor, and/or other one or more attributes associated with the call.

Contact centers may have 80-100 completion codes. A particular outbound campaign completion code list may consist set of 20-25 completion codes per region. Agents often work on multi-channel conversation and campaigns in parallel. After each conversation is complete, the agent is expected to quickly release the work item by selecting one of the completion/disposition code from list.

When the agent completes the call with the customer, it takes time to reflect on the call and analyze the call channel type, call outcome, and any follow-up actions. This time is commonly referred to as wrap-up time and includes entering a completion code. However, wrap-up time is often carefully monitored or automatically terminated, after which the agent is connected to another call with another customer. Accordingly, agents may not spend the time necessary to identify and enter the proper completion code. As a result, selecting a completion code is resource intensive and error prone.

SUMMARY

While choosing from shown completion codes, most often due to complexities during conversation, agents have to traverse through many, or even all, completion codes and select the most suitable completion code for a completed conversation with customer. Even after configuring accurate completion codes, such as to present only completion codes relevant for only a particular campaign, the agents still need to manually review all presented completion codes to select the most appropriate code or codes.

These and other needs are addressed by the various embodiments and configurations of the present invention. The present invention can provide a number of advantages depending on the particular configuration. These and other advantages will be apparent from the disclosure of the invention(s) contained herein. In another embodiment, metadata, such as time of day, day of week, day of month, type customer communication device, reason for the call, event triggering the call, etc., may be used to select or filter quick release codes from a larger pool of completion codes.

The process for choosing an accurate code from long completion code list is inconvenient for an agent. It may require a significant amount time and/or be error prone, as the allotted after-call work time is limited. Accordingly, providing real-time identification of quick release codes, while agent is in active conversations, is disclosed herein. Additionally or alternatively, entry of the quick release code causes the connection to be terminated with the customer, when the communication is a real-time communication (e.g., voice, video) or terminated with a server and/or customer when the communication mode is not a real-time communication (e.g., SMS text, text chat, etc.). In a further additional or alternative embodiment, the quick release code may be automatically applied.

In one embodiment, systems and methods are disclosed to allow an agent to select a quick release code(s), having a particular meaning(s) associated with the call, and disconnecting from the call, in single step. Codes may be dynamically presented to the agent as automated systems evaluate the call data and/or content of the call. Additionally or alternatively, automated selection and/or disconnection of the call is provided without human intervention.

Completion codes may be specific to business or otherwise filtered to only show a limited number of completion codes previously determined to have a potential relevance to a particular call. These pre-configured completion codes or quick release codes are shown to the agent.

In one embodiment, real-time monitoring of the call is performed to identify, suggest, and/or apply a completion code. The identification of the completion code may be performed, in whole or in part, from agent activities, language, region, call direction, channel type, telephony events, campaign reports, data values, and/or other elements. The paired-down list of quick release code(s) will be presented to an agent on screen and if agent confirms conversation marked as completed. Additionally or alternatively, the quick-release code(s) will be automatically applied without human intervention or upon confirmation of a suggested code(s).

In another embodiment, the call events and/or call content is analyzed to determine the completion code. For example, a customer's preferred language may be used to identify the completion code when multilingual calls are conducted. In other embodiments, the customer's region or country may be utilized to reduce the pool of candidate completion codes and/or determine a completion code. Similarly, completion codes may be selected, from the channel type (e.g., SMS, email, text-chat, voice call, voice-video, social media, etc.). The output to the agent and/or call management system will be a list of completion code(s) which will have most relevant reduced set of quick release code(s) based on the determined parameters.

Contact centers usually have designated completion code (s) for callbacks. In another embodiment, the algorithm can take callback related completion code(s) into consideration and show related quick release code(s) when agent creates the callback during the active conversation. For example code(s) like "callback-morning," "callback-evening," "callback-weekend," will appear as quick release code(s) when a callbacks is created by the agent. If the agent selects the start time of "morning," then "callback-morning" can be identified as suggestion for quick release. Similarly when callback gets matured, other completion code(s) can be shown.

Based on call classification for an outbound call made by agent, suggestion and/or selection of quick release code(s) can be achieved, in whole or in part. For example for a preview type of campaign when agent dials a number and the call fails, then the completion codes related to call failure will appear in quick release code(s) to make it convenient for agent to select the completion code to enable the agent to quickly release and wrap-up the call). This can include codes for invalid number, busy, phone switch-off, ringing-no-response, network-issue, etc.

In another embodiment, suggested quick release code(s) may be a subset of all codes. The subset configured by a supervisor. In another embodiment, an algorithm will evaluate historical call reports and all the relevant call related data, like completion codes for a body of previously completed calls and any associated notes for the calls. In response, the algorithm, suggests/uses codes based on the frequency of the completion codes marked by the agents for the previous calls. It can also consider other input parameters like previously saved notes and relevancy of these notes with marked completion codes.

In one embodiment, a system is disclosed, comprising: a data storage; a network interface to a network; a processor configured with machine-readable instructions; and wherein the processor: monitors, by the network interface, a communication between a customer utilizing a customer communication device and an agent utilizing an agent communication device conducted over the network; determine, from the communication, attributes of the communication; cause a number of indicia of the attributes of the communication to be presented for selection of one thereof, by an input to the agent communication device; and in response to receiving the input, alone and without any subsequent inputs, selecting the one of the number of indicia, both terminating the communication and updating a record in the data storage to comprise the selected one of the number of indicia.

In another embodiment, a method is disclosed, comprising: monitoring a communication between a customer utilizing a customer communication device and an agent utilizing an agent communication device conducted over a network; determining, from the communication, attributes of the communication; causing a number of indicia of the attributes of the communication to be presented for selection of one thereof, by an input to the agent communication device; and in response to receiving the input, alone and without any subsequent inputs, selecting the one of the number of indicia, terminating the communication and updating a record in the data storage to comprise the selected one of the number of indicia.

In another embodiment, a system is disclosed, comprising: means for monitoring a communication between a customer utilizing a customer communication device and an agent utilizing an agent communication device conducted over a network; means for determining, from the communication, attributes of the communication; means for causing a number of indicia of the attributes of the communication to be presented for selection of one thereof, by an input to the agent communication device; and means for, in response to receiving the input, alone and without any subsequent inputs, selecting the one of the number of indicia, terminating the communication and updating a record in the data storage to comprise the selected one of the number of indicia.

A system on a chip (SoC) including any one or more of the above aspects.

One or more means for performing any one or more of the above aspects.

Any one or more of the aspects as substantially described herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
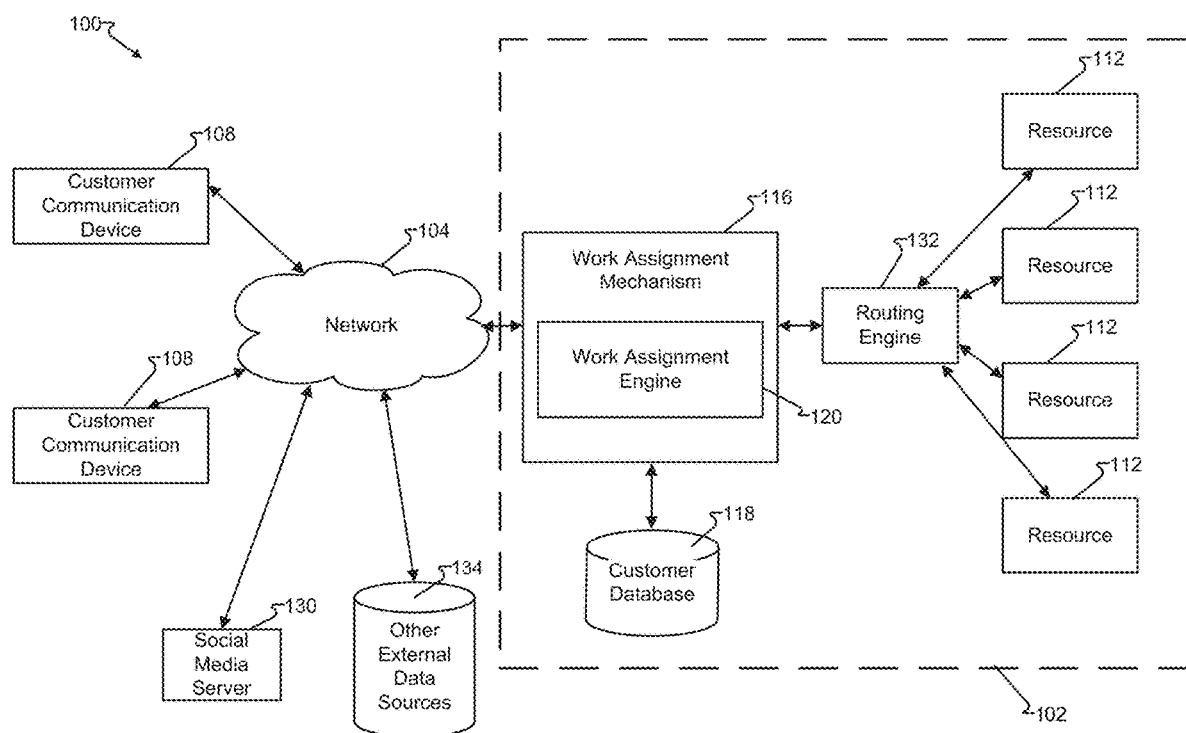
FIG. 1 depicts a first system in accordance with embodiments of the present disclosure.

FIG. 1 depicts communication system 100 in accordance with at least some embodiments of the present disclosure. The communication system 100 may be a distributed system and, in some embodiments, comprises a communication network 104 connecting one or more customer communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The customer communication devices 108 may correspond to customer communication devices. In accordance with at least some embodiments of the present disclosure, a customer may utilize their customer communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media server 130 or network of servers. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the customer communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the customer communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the customer communication devices 108 may comprise any type of known communication equipment or collection of communication equipment. Examples of a suitable customer communication device 108 include, but are not limited to, a personal computer, laptop, Personal Digital Assistant (PDA), cellular phone, smart phone, telephone, or combinations thereof. In general, each customer communication device 108 may be adapted to support video, audio, text, and/or data communications with other customer communication devices 108 as well as the processing resources 112. The type of medium used by the customer communication device 108 to communicate with other customer communication devices 108 or processing resources 112 may depend upon the communication applications available on the customer communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more hardware components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage hardware components may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
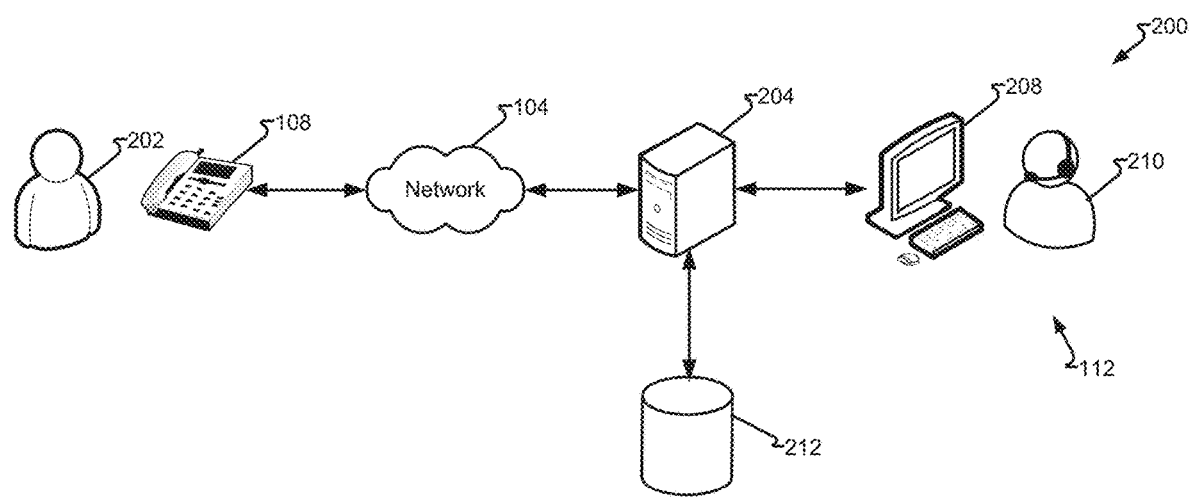
FIG. 2 depicts a second system in accordance with embodiments of the present disclosure.

FIG. 2 depicts system 200 in accordance with embodiments of the present disclosure. In one embodiment, system 200 illustrates communication system 100 with portions thereof omitted to avoid unnecessarily complicating the figure and associated description. In another embodiment, system 200 comprises additional and/or alternative components of communication system 100.

In one embodiment, customer 202, via customer communication device 108 is engaged in a communication with agent 210, via agent communication device 208 over network 104. The communication may be a real-time communication (e.g., voice and/or video) or non-real-time (e.g., SMS, email, etc.). When the communication is not a real-time communication, customer 202 and agent 210 may communicate via messages (e.g., one or more data packets) having a header addressed to, and received by, server 204. For example, customer 202 may send a message to agent 210 to a contact center email to contact center 102 (e.g., "support@address.com"). Server 204 then accesses secondary information, such the subject line "[Ticket 1122334455]: I'm having a problem with my computer", where the identifier (e.g., ticket number) is then utilized to route the communication to the same agent (i.e., agent 210) unless otherwise re-assigned to a different agent. Additionally or alternatively, the email or other sender information identifying customer 202 may be utilized to determine a particular agent to receive the communication. Accordingly, when the communication is terminated, messages received by server 204 from customer 202 are no longer automatically routed to agent 210 and may be routed to a different automated or human resource. The communication, such as to address a particular work item may be closed and any subsequent communications then associated with a different work item. Accordingly, a subsequent communication, following termination of the first communication, may still be routed to the same agent 210, but only after work assignment engine 120 evaluates and assigns the current communication to an agent, which may or may not be agent 210.

In another embodiment, the communication is a real-time communication. For example, voice data is captured by a microphone of customer communication device 108 and/or agent communication device 208 (e.g., or peripheral device, such as a headset), encoded for transmission over network 104, and decoded and presented by the other of customer communication device 108 or agent communication device 208. Similarly, video may be captured by a camera (not shown), encoded, and presented by a display of agent communication device 208 or a display (not shown) of customer communication device 108. When a communication between customer 202 and agent 210 is terminated, agent communication device 208 is disconnected. Customer communication device 108 may also be immediate disconnected or, in another embodiment, held or transferred by server 204, such as to conduct an after-call customer satisfaction survey. Termination may be conducted by sending a Session Initiation Protocol (SIP) "BYE" message or similar message to disconnect from a media stream interconnecting customer communication device 108 and agent communication device 208.

When the call is terminated, or terminating (e.g., closing remarks are being made), agent 210 may provide an input to agent communication device 208 and/or a peripheral component thereof, to close the work item with an appropriate quick release code and terminate the communication. A list, which may comprise hundreds of completion codes, may be stored in a data repository, such as data storage 212. Server 204 comprises one or more processors and may initially exclude completion codes that are known not to be relevant from either an attribute of the call or of content provided within the communication. For example, if customer 202 initiated the call then no completion code related to call attributes associated with outbound calls will apply and may be eliminated from further consideration.

Server 204 may monitor the communication (e.g., words spoke or typed and exchanged) between customer 202 and agent 210 to select additional attributes, as either potential or candidate attributes, or exclusion attributes. For example, if at some point in the communication customer 202 said, "Can we talk in Spanish?" or similar, then a completion code may be selected associated with the preference to communicate in Spanish (e.g., "Call complete—Prefers Spanish", "Callback requested—Spanish speaking agent requested," etc.).

In on embodiment, server 204 determines that only one completion code applies, and then automatically apply the completion code and terminates the communication without human intervention. This may also occur if resource 112 is embodied as an automated resource. Additionally or alternatively, agent 210 may be required to confirm the completion code or override the completion code, such as within five seconds or other timeframe, to prevent the automatic application of the completion code and termination of the communication.

In other embodiments, at least two completion codes are determined to apply. The two or more completion codes may be weighted, such as due to a confidence level of each, and presented in priority order (e.g., the most likely be presented first or most prominently). The at least two completion codes may be presented as quick release codes. For example, call completion code "3045" may have a meaning, such as, "Call complete, callback requested, Spanish requested" and call completion code "3046" may have a meaning of, "Call completed, callback needed, Spanish required," and replaced with quick release code "1" and "2" having the respective meanings. Once the quick release code is selected, a record of the communication, such as a recording, transcript, action items, etc., may be updated (e.g., created or modified) to comprise the quick release code and/or the associated completion code and, without any further human action, terminate the communication. As a result of the termination, agent 210 may be identified as able to accept a subsequent communication and, if available, connected to the subsequent communication with a different customer. Automatic termination may be immediate or, as a further option, announced and absent an override input being received upon agent communication device 208, terminated after a brief delay, such as three seconds.

Identification of relevant quick release codes may be based on communication attributes, excluding the content therein, including but not limit to, mode of communication (e.g., voice, video, text, social media, etc.), time/date, length, geographic region of customer communication device 108, connection quality, device type of customer communication device 108, etc.; communication attributes of the content, including but not limited to words/phrases spoken or typed by customer 202 and/or agent 210, accent of customer 202, mood of customer 202, implicit requests (e.g., "it would be better if we could speak Spanish"), explicit requests (e.g., "I need to speak to someone in Spanish."), apparent age of customer 202, apparent gender of customer 202, apparent education level of customer 202, apparent desire for formality/informality of customer 202, subject matter of the communication (e.g., troubleshoot a product, book an international flight, etc.), etc.; and/or reason for the termination (e.g., issue resolved, purchase made, customer 202 was not interested, network fault, hang-up, scheduling conflict with callback requested, etc.). Accordingly, server 204 may monitor the communication and/or contents of the communication to determine which quick release codes may apply.

In one embodiment, a neural network is provided, such as one or more processes embodied as machine-readable instructions maintained in a non-transitory memory and executed by a processor(s) of agent communication device 208 and/or other processing device(s) in communication with agent communication device 208. The neural network may be utilized to determine quick release code(s) to provide for selection upon agent communication device 208 or, optionally, automatically enter by server 204.

In one embodiment, a processor of server 204 may execute instructions of an algorithm embodied as machine-readable instructions maintained in a non-transitory storage that, when executed by the processor, match at attribute of the communication (e.g., time/date, device used, etc.) to a record, such as maintained in data storage 212. Upon matching the attribute, further accessing a completion code associated with the record for selection as a quick release code. Similarly, an attribute of the termination (e.g., network fault, customer hang-up, completed, etc.) may be matched to a completion code by the processor executing instructions of an algorithm embodied as machine-readable instructions maintained in a non-transitory storage that, when executed by the processor. In another embodiment, a processor of server 204 may execute instructions of an algorithm embodied as machine-readable instructions maintained in a non-transitory storage that, when executed by the processor, to match words and/or phrases to records associated with completion codes. When such a word or phrase is encountered, the associated completion code is selected as a quick release code.

Human language is complex and nuanced. Accordingly, various combinations of textual or spoken contents can differ in their content but convey the same meaning. For example, there are countless ways that customer 202 may convey, "no" to agent 210, to name a few, "nope," "I can't do that," "pass," etc. As an alternative to programming a system to look for each phrase, an artificially intelligent system may determine if a particular meaning was more likely than not to have been expressed by a particular work or phrase. For example, server 204 may comprise or access at least one processor executing a neural network.

A neural network, as is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive.

By way of example, a first layer of nodes may evaluate a communication for a particular word, where the word is detected, the nodes provide an input to a next layer of nodes. The next layer of nodes may look for phrases or word combinations such as to delineate a particular expression from other portions of the communication. For example, the word (or other utterance) of "yeah" may have more than one meaning, as in, "yeah, I'm interested," versus, "yeah, I'm going to pass on that." Again, the nodes that find a target expression are active and provide an input to a next layer of nodes which may then look for a subject or target of the phrase or other features. The process continues until a conclusion is reached that a particular meaning is, or is not, provided within a communication. As a further embodiment, a particular completion code, and subsequent quick release code may be determined to match or match to a particular degree.

Accordingly, and in one embodiment, a number of seed communications (or portions of one or more communications) previously conducted are provided to the neural network having a particular meaning. For example, various ways in which a customer and/or agent may express the need to end a communication but continue at a later time. The seed communication may be provided to an agent and/or automated resource to determine a meaning of a particular word or phrase and provide the meaning to the neural network. Additionally, the agent or other resource may provide variations in word choice, word order, phrasing, placement of vocal emphasis, etc. that do, and optionally do not, convey the same meaning. These variations may include one or more of acceptable ranges of a word or words within a communication to each other or within a communication. With the seed communications and variations of the seed communications, a first training is performed on the neural network.

As a result of the first training, one or more completion codes/quick release codes, may incorrectly identify communication content as having the meaning associated with the particular completion code/quick release code. Accordingly, a second training step is conducted comprising the seed communications, the variations of the seed communications, and a number of communications (or portions thereof) that do no comprise the meaning associated with the completion code/quick release code that were incorrectly identified as associated with the completion code/quick release code.

Figure 3:
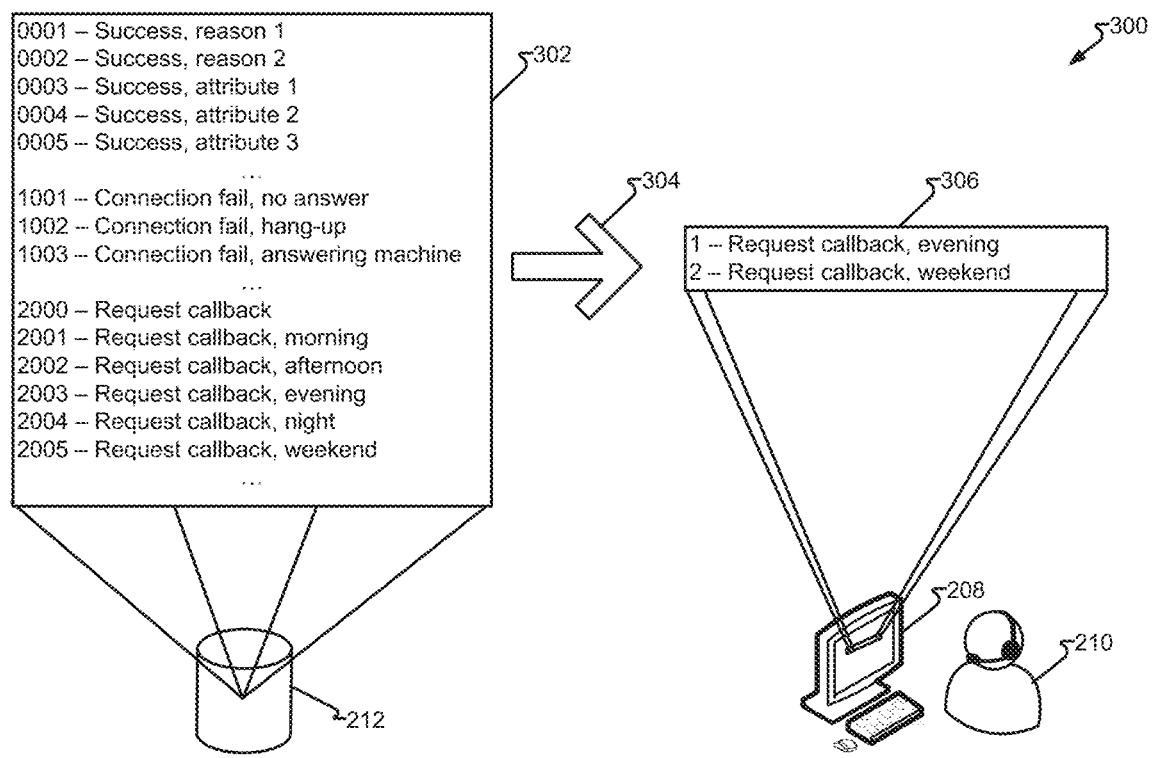
FIG. 3 depicts a first data flow in accordance with embodiments of the present disclosure.

FIG. 3 depicts data flow 300 in accordance with embodiments of the present disclosure. In one embodiment, superset 302 of completion codes is maintained in data storage 212. Superset 302 may comprise all completion codes utilized by contact center 102 or few, but at least all completion codes that may be applied to a communication with agent 210. For example, if agent 210 is providing technical support for "Product A" but not "Product B" then superset 302 may comprise at least all completion codes for "Product A" but, in another embodiment, may also include completion codes for "Product B."

Processing 304, represented by an arrow, is performed by at least one processor, such as a processor of server 204 to eliminate irrelevant completion codes, such as to remove any completion codes for products not covered (e.g., "Product B"), modes of communication not used, etc.; select relevant completion codes, such as to obtain attributes of the communication (e.g., hang-up, network fault, etc.) and/or content of the communication (e.g., purchase made, problem resolved, problem not resolved and callback scheduled, etc.) to produce quick release codes 306.

In another embodiment, processing 304 may utilize call metadata, such as time of day, day of week, day of month, type customer communication device 108, reason for the call, event triggering the call, etc. For example, an airline may have had weather related delays and, as a result, processing 304 may populate quick release codes 306 with related codes for rescheduling, refunds, or other aspects related to cancelled. flights due to bad weather even if weather is not expressly discussed by customer 202 or agent 210.

Quick release codes 306 may then be presented for selection upon agent communication device 208 by agent 210 and, upon selection, a record of the communication updated with the selected quick release code and/or associated completion code and, without any further human intervention, the communication terminated. For example quick release code "2" within quick release codes 306, in may be the same completion code "2005" of completion codes in superset 302 and, therefore either or both may be recorded to a record of the communication, such as may be maintained in data storage 212. The listing of the member of quick release codes 306 may be prioritized, such as a most likely based on a weighting of the confidence that a processor of server 204 determines for each quick release code. The selection of the quick release code then causes agent communication device 208 to be disconnected from the communication.

As a further embodiment, if quick release codes 306 comprises only one member, agent communication device 208, server 204, and/or another computing/networking component may automatically apply the quick release code and/or associated completion code to the record and disconnect agent communication device 208 from the communication, without any further human intervention.

Figure 4:
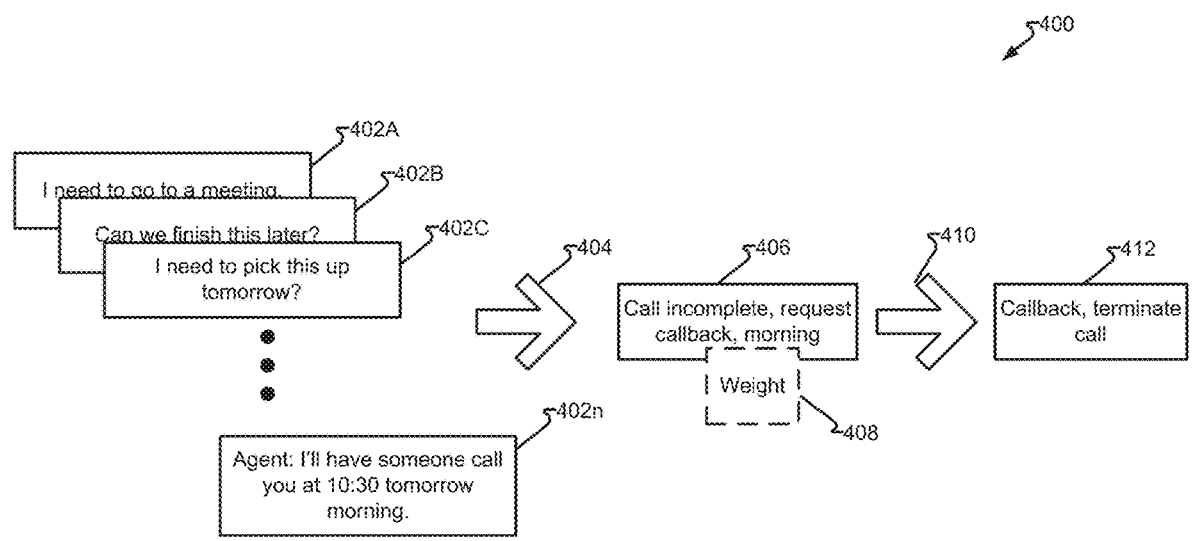
FIG. 4 depicts a second data flow in accordance with embodiments of the present disclosure.

FIG. 4 depicts data flow 400 in accordance with embodiments of the present disclosure. Data flow 400 illustrates communication content 402 that may be observed by server 204. Communication content 402A-402C, illustrating words spoken or typed by customer 202 and communication content 402n illustrating words spoken or typed by agent 210.

Processing 404, such as performed by a processor of server 204 configured with machine-readable instructions maintained in a non-transitory data storage, such as data storage 212 and/or other data storage, monitors the communication and receives communication content 402. Processing 404 may determine that one or more of communication content 402 is associated with an unresolved or incomplete communication (e.g., call) and that a callback has been requested or scheduled, matching a record of data storage 212, associated with candidate completion code 406. Optionally, processing 404 may determine weight 408 associated with candidate completion code 406. Weight 408 may be determined, in whole or in part, by an explicit statement (e.g., "Please call me back tomorrow morning at 10:30?"), which may be determined to match candidate completion code 406 with a high degree of weighting, or implicitly (e.g., "I need to go. Maybe we can continue this tomorrow before noon?"), which may be determined as matching candidate completion code 406 with a lesser certainty and, therefore, lower weighting. As the communication continues, additional candidate completion codes may be identified and/or weighted. Those identified, or identified and having a weight above a previously defined threshold, may be further processed in process 410 and be presented as quick release code 412 for selection.

Figure 5:
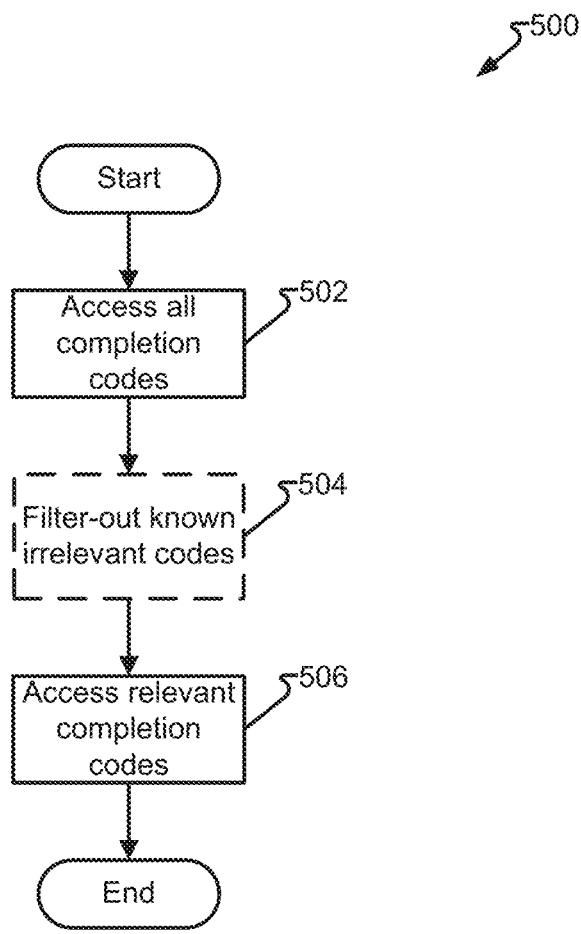
FIG. 5 depicts a first process in accordance with embodiments of the present disclosure.

FIG. 5 depicts process 500 in accordance with embodiments of the present disclosure. Process 500 may be embodied as machine-readable instructions maintained in a non-transitory storage that, when read by a processor, cause the processor to execute the steps thereof. Process 500 is generally directed to the identification of completion codes to be presented as quick release codes, such as upon agent communication device 208 for manual or automatic selection of one release code and to cause the communication to be terminated entirely or with respect to agent communication device 208.

Step 502 accesses all completion codes. Step 504 may access all completion codes for contact center 102 or less than all codes but a superset of potentially relevant completion codes. Optionally step 504 filters or limits access to only completion codes that may apply to a particular communication. Step 504 may be the elimination of completion codes from those accessed in step 504 that are known to be irrelevant to a particular communication. Step 506 accesses relevant completion codes for a particular communication. Step 506 may be determined, in whole or in part, from attributes of the communication connection (e.g., time of day, device utilized, region, etc.), attribute of the communication content (e.g., accent of customer 202, language spoken, words/phrases said or typed, scheduled callback, etc.), and/or termination when the termination is not the result of entry of the quick release code (e.g., network fault, customer hang-up, etc.). As a result of step 506, relevant completion codes may be presented as quick release codes for selection by an input to agent communication device 208 and/or an associated peripheral device.

Figure 6:
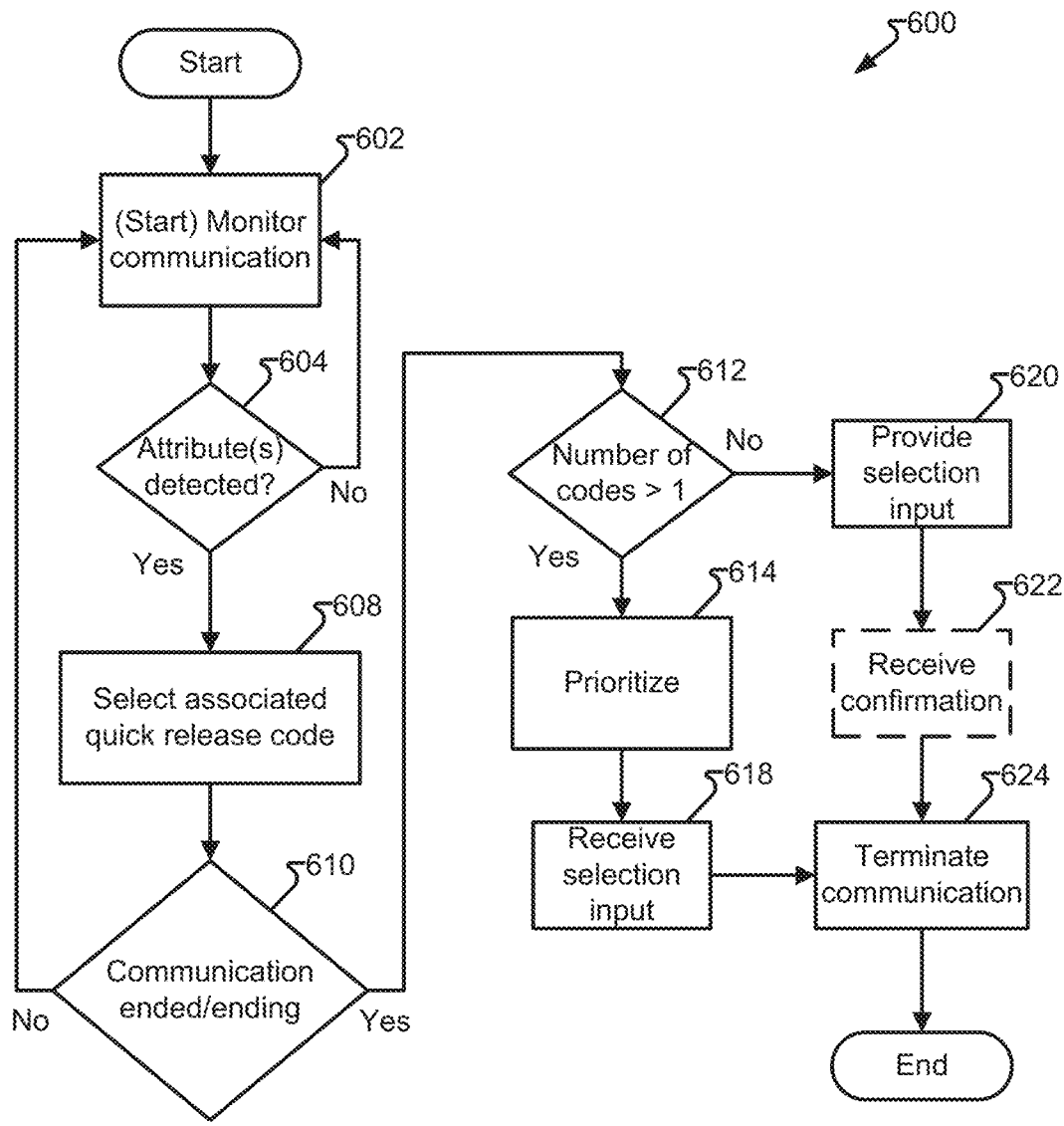
FIG. 6 depicts a second process in accordance with embodiments of the present disclosure.

FIG. 6 depicts a second process in accordance with embodiments of the present disclosure. Process 600 may be embodied as machine-readable instructions maintained in a non-transitory storage that, when read by a processor, cause the processor to execute the steps thereof. Process 600 generally presents relevant quick release codes upon agent communication device 208 for selection and, when selected, both updates a record of the communication and terminates the communication.

Step 602 may be initiated and/or continued throughout the duration of a communication between customer 202 utilizing customer communication device 108 and agent 210 utilizing agent communication device 208. Accordingly, as step 602 is illustrated as a single step, however, continuous operation is also contemplated alone or looping through one or more subsequent steps, other than step 624, which would be performed one time per communication. Test 604 determines if an attribute is detected. Test 604 may detect attributes in the communication outside of the content (e.g., time, type of communication, type of customer communication device 108, etc.), communication content (e.g., what is said/typed by customer 202 and/or agent 210; emotion, mood, accent, language spoken in whole or in part, and/or other vocalization or written expression; formality, education, and/or other speech/writing attribute; etc.).

If no attribute is detected, processing may loop back to step 602 to continue monitoring the communication. If the communication ends without test 604 never detecting an attribute, then process 600 may be terminated and re-initiated for a different communication. However, if test 604 detects an attribute, or attributes, then step 608 selects an associated quick release code(s) for the attributes. Optionally, process 600 may weight or otherwise score attributes associated with a quick release code for subsequent prioritization (e.g., see step 614) or to exclude attributes having a below-threshold confidence. Test 610 determines if the communication has ended, by a means other than entry of a quick release code (e.g., network fault, customer hang-up, etc.). Test 610 may also determine if a communication is ending, such as an agent is providing closing content (e.g., "Thank you for calling . . . ," "Is there anything else I can help you with today?" etc.). And if test 610 is determined in the negative, processing may loop back to step 602 to continue monitoring the communication. If test 610 is determined in the affirmative, processing may continue to test 612. However, test 610 may be omitted and, as described above, loop through all steps other than termination step 624.

Test 612 determines if more than one quick release code has been determined and, yes, processing continues to step 614 which may prioritize the completion codes such as to present the completion codes in a ranked order of confidence. An input, such as to agent communication device 208, is received in step 618 selecting one of the completion codes and, as a result, step 624 terminates the communication and updates a record of the communication with the completion code and/or the quick release code. If test 612 is determined in the negative, that is, there is only one quick release code candidate, then an automated system may provide the selection in step 620. Optionally, agent 210 may be presented with an opportunity to confirm or provide an override, such as within a particular time, in step 622. If a confirmation is not received, then processor may automatically provide the input selecting the one quick release code and, in step 624, terminate the communication and update a record of the communication.

Figure 7:
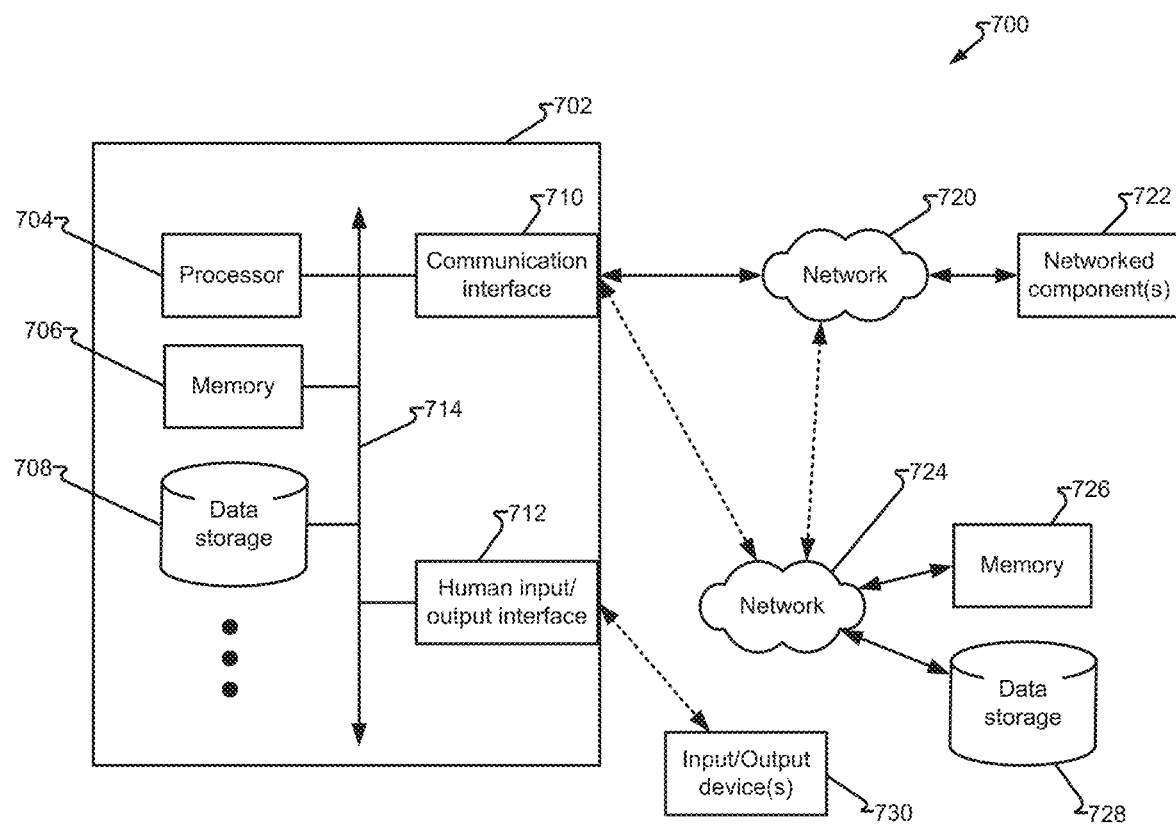
FIG. 7 depicts a third system in accordance with embodiments of the present disclosure.

FIG. 7 depicts device 702 in system 700 in accordance with embodiments of the present disclosure. In one embodiment, server 204 and/or agent communication device 208 may be embodied, in whole or in part, as device 702 comprising various components and connections to other components and/or systems. The components are variously embodied and may comprise processor 704. The term "processor," as used herein, refers exclusively to electronic hardware components comprising electrical circuitry with connections (e.g., pin-outs) to convey encoded electrical signals to and from the electrical circuitry. Processor 704 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 714, executes instructions, and outputs data, again such as via bus 714. In other embodiments, processor 704 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 704 is a non-transitory computing device (e.g., electronic machine comprising circuitry and connections to communicate with other components and devices). Processor 704 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 704). Processor 704 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 704, device 702 may utilize memory 706 and/or data storage 708 for the storage of accessible data, such as instructions, values, etc. Communication interface 710 facilitates communication with components, such as processor 704 via bus 714 with components not accessible via bus 714. Communication interface 710 may be embodied as a network port, card, cable, or other configured hardware device. Additionally or alternatively, human input/output interface 712 connects to one or more interface components to receive and/or present information (e.g., instructions, data, values, etc.) to and/or from a human and/or electronic device. Examples of input/output devices 730 that may be connected to input/output interface include, but are not limited to, keyboard, mouse, trackball, printers, displays, sensor, switch, relay, speaker, microphone, still and/or video camera, etc. In another embodiment, communication interface 710 may comprise, or be comprised by, human input/output interface 712. Communication interface 710 may be configured to communicate directly with a networked component or utilize one or more networks, such as network 720 and/or network 724.

Network 104 may be embodied, in whole or in part, as network 720. Network 720 may be a wired network (e.g., Ethernet), wireless (e.g., WiFi, Bluetooth, cellular, etc.) network, or combination thereof and enable device 702 to communicate with network component(s) 722. In other embodiments, network 720 may be embodied, in whole or in part, as a telephony network (e.g., public switched telephone network (PSTN), private branch exchange (PBX), cellular telephony network, etc.)

Additionally or alternatively, one or more other networks may be utilized. For example, network 724 may represent a second network, which may facilitate communication with components utilized by device 702. For example, network 724 may be an internal network to a business entity or other organization, such as contact center 102, whereby components are trusted (or at least more so) that networked components 722, which may be connected to network 720 comprising a public network (e.g., Internet) that may not be as trusted.

Components attached to network 724 may include memory 726, data storage 728, input/output device(s) 730, and/or other components that may be accessible to processor 704. For example, memory 726 and/or data storage 728 may supplement or supplant memory 706 and/or data storage 708 entirely or for a particular task or purpose. For example, memory 726 and/or data storage 728 may be an external data repository (e.g., server farm, array, "cloud," etc.) and allow device 702, and/or other devices, to access data thereon. Similarly, input/output device(s) 730 may be accessed by processor 704 via human input/output interface 712 and/or via communication interface 710 either directly, via network 724, via network 720 alone (not shown), or via networks 724 and 720. Each of memory 706, data storage 708, memory 726, data storage 728 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 730 may be a router, switch, port, or other communication component such that a particular output of processor 704 enables (or disables) input/output device 730, which may be associated with network 720 and/or network 724, to allow (or disallow) communications between two or more nodes on network 720 and/or network 724. For example, a connection between one particular customer, using a particular customer communication device 108, may be enabled (or disabled) with a particular networked component 722 and/or particular resource 112. Similarly, one particular networked component 722 and/or resource 112 may be enabled (or disabled) from communicating with a particular other networked component 722 and/or resource 112, including, in certain embodiments, device 702 or vice versa. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   a data storage;
   a network interface to a network;
   a processor configured with machine-readable instructions; and
   wherein the processor:
      monitors, by the network interface, a communication between a customer utilizing a customer communication device and an agent utilizing an agent communication device conducted over the network;
determine, from the communication, attributes of the communication;
cause a number of indicia of the attributes of the communication to be presented for selection of one thereof, by an input to the agent communication device; and
in response to receiving the input, alone and without any subsequent inputs, selecting the one of the number of indicia, both terminating the communication and updating a record in the data storage to comprise the selected one of the number of indicia.

2. The system of claim 1, wherein at least one of the attributes of the communication describes at least one of a reason for the terminating, an attribute of the customer, a content of the communication.

3. The system of claim 1, wherein the processor determines attributes of the communication comprising providing the communication to a neural network trained to determine attributes from the communication.

4. The system of claim 3, wherein neural network is trained to determine the attributes of the communication, comprising:
collecting a set of communications from a database maintained in the data storage;
applying one or more transformations to each communication in the collected set of communications including substituting a portion of content of the communication with a different content having a same meaning as the portion of the content to create a modified set of communications;
creating a first training set comprising the collected set of communications, the modified set of communications, and a set of communications absent the attributes of the communication;
training the neural network in a first state using the first training set;
creating a second training set for a second state of training comprising the first training set and the collected set of communications absent the attributes of the communication that are incorrectly detected as having the attributes of the communication after the first state of training; and
training the neural network in a second state using the second training set.

5. The system of claim 1, wherein the processor causes the number of indicia of the attributes of the communication to be presented for selection, further comprising the processor performing:
determining a reliability score for each of the attributes of the communication;
accessing a threshold reliability score; and
causing the number of indicia of the attributes of the communication to be presented for selection for those attributes of the communication having a reliability score of at least the threshold reliability score.

6. The system of claim 5, wherein the processor determines the reliability score as a degree of match to a model communication content having at least one of the attributes of the communication.

7. The system of claim 5, wherein a degree of match is determined to exceed a conclusion threshold and, in response, terminating the communication prior to receiving the input.

8. The system of claim 1, wherein the communication comprises a real-time communication and termination of the communication comprises terminating media exchanged between the agent communication device and the customer communication device.

9. The system of claim 1, wherein the communication comprises a turn-based communication comprising a number of messages and termination of the communication comprises causing signaling a communication server to route a message received from the customer communication device, which is received after the termination, to a destination other than the agent communication device.

10. A method, comprising:
monitoring a communication between a customer utilizing a customer communication device and an agent utilizing an agent communication device conducted over a network;
determining, from the communication, attributes of the communication;
causing a number of indicia of the attributes of the communication to be presented for selection of one thereof, by an input to the agent communication device; and
in response to receiving the input, alone and without any subsequent inputs, selecting the one of the number of indicia, terminating the communication and updating a record in data storage to comprise the selected one of the number of indicia.

11. The method of claim 10, wherein at least one of the attributes of the communication describes at least one of a reason for the terminating, an attribute of the customer, a content of the communication.

12. The method of claim 10, wherein determining the attributes of the communication comprising providing the communication to a neural network trained to determine attributes from the communication.

13. The method of claim 12, wherein neural network is trained to determine the attributes of the communication, comprising:
collecting a set of communications from a database maintained in the data storage;
applying one or more transformations to each communication in the collected set of communications including substituting a portion of content of the communication with a different content having a same meaning as the portion of the content to create a modified set of communications;
creating a first training set comprising the collected set of communications, the modified set of communications, and a set of communications absent the attributes of the communication;
training the neural network in a first state using the first training set;
creating a second training set for a second state of training comprising the first training set and the collected set of communications absent the attributes of the communication that are incorrectly detected as having the attributes of the communication after the first state of training; and
training the neural network in a second state using the second training set.

14. The method of claim 10, wherein causing the number of indicia of the attributes to be presented for selection, further comprises:
determining a reliability score for each of the attributes;
accessing a threshold reliability score; and causing the number of indicia of the attributes to be presented for selection for those attributes having a reliability score of at least the threshold reliability score.

15. The method of claim 14, wherein determining the reliability score as a degree of match to a model communication content having at least one of the attributes.

16. The method of claim 15, wherein the degree of match is determined to exceed a conclusion threshold and, in response, terminating the communication prior to receiving the input.

17. The method of claim 10, wherein the communication comprises a real-time communication and termination of the communication comprises terminating media exchanged between the agent communication device and the customer communication device.

18. The method of claim 10, wherein the communication comprises a turn-based communication comprising a number of messages and termination of the communication comprises causing signaling a communication server to route a message received from the customer communication device, which is received after the termination, to a destination other than the agent communication device.

19. A system, comprising:
means for monitoring a communication between a customer utilizing a customer communication device and an agent utilizing an agent communication device conducted over a network;
means for determining, from the communication, attributes of the communication;
means for causing a number of indicia of the attributes of the communication to be presented for selection of one thereof, by an input to the agent communication device; and
means for, in response to receiving the input, alone and without any subsequent inputs, selecting the one of the number of indicia, terminating the communication and updating a record in data storage to comprise the selected one of the number of indicia.

20. The system of claim 19, wherein at least one of the attributes of the communication describes at least one of a reason for the terminating, an attribute of the customer, a content of the communication.

* * * * *